(12) United States Patent
Tsuboi et al.

(10) Patent No.: US 9,863,466 B2
(45) Date of Patent: Jan. 9, 2018

(54) SLIDING BEARING

(71) Applicant: TAIHO KOGYO Co., Ltd., Toyota-shi, Aichi (JP)

(72) Inventors: Yoichiro Tsuboi, Toyota (JP); Koichi Yatsuda, Toyota (JP); Atsushi Ueyama, Toyota (JP)

(73) Assignee: TAIHO KOGYO CO., LTD., Toyota-shi, Aichi (JP)

( * ) Notice: Subject to any disclaimer, the term of this patent is extended or adjusted under 35 U.S.C. 154(b) by 0 days.

(21) Appl. No.: 15/326,578

(22) PCT Filed: May 24, 2016

(86) PCT No.: PCT/JP2016/065304
§ 371 (c)(1),
(2) Date: Jan. 16, 2017

(87) PCT Pub. No.: WO2016/203912
PCT Pub. Date: Dec. 22, 2016

(65) Prior Publication Data
US 2017/0204900 A1  Jul. 20, 2017

(30) Foreign Application Priority Data

Jun. 19, 2015 (JP) .................................. 2015-123785

(51) Int. Cl.
*F16C 9/02* (2006.01)
*F16C 17/02* (2006.01)
(Continued)

(52) U.S. Cl.
CPC .............. *F16C 17/022* (2013.01); *F16C 9/02* (2013.01); *F16C 17/10* (2013.01); *F16C 33/046* (2013.01);
(Continued)

(58) Field of Classification Search
CPC .. F16C 9/02; F16C 9/04; F16C 17/022; F16C 17/10; F16C 17/107; F16C 33/046; F16C 2360/22
See application file for complete search history.

(56) References Cited

U.S. PATENT DOCUMENTS

| | | | | |
|---|---|---|---|---|
| 5,062,718 A | * | 11/1991 | Lenhard-Backhaus | F16C 17/10 384/275 |
| 5,145,264 A | * | 9/1992 | Bryden | F16C 17/10 384/275 |
| 2010/0215300 A1 | * | 8/2010 | Schlabs | F16C 17/10 384/420 |

(Continued)

FOREIGN PATENT DOCUMENTS

DE   40 15 256 A1   11/1991
GB   1 386 253 A    3/1975
(Continued)

OTHER PUBLICATIONS

International Search Report for PCT/JP2016/065304 (1 page).
European Search Report for corresponding application No. 16811387.6, dated Sep. 11, 2017 (6 pages).

*Primary Examiner* — Phillip A Johnson
(74) *Attorney, Agent, or Firm* — Flynn, Thiel, Boutell & Tanis, P.C.

(57) ABSTRACT

Bearing 10 includes: a half bearing member having an inner circumferential face that slides against an associated shaft, and a plurality of recesses provided in a first end face in an axial direction of the associated shaft; a flange member having a plurality of projections provided at positions corresponding to the plurality of recesses provided in the first end face; and a plurality of staking marks formed in a periphery of each recess when each recess is staked in a state where each of the plurality of projections is fitted to a corresponding one of the plurality of recesses in the first end face to fix the flange member to the half bearing member, wherein a free spread of the half bearing member before the (Continued)

staking is at least 0.2 mm wider than a spread of the half bearing after the staking.

2 Claims, 4 Drawing Sheets

(51) Int. Cl.
*F16C 43/02* (2006.01)
*F16C 17/10* (2006.01)
*F16C 33/04* (2006.01)
*F16C 33/08* (2006.01)

(52) U.S. Cl.
CPC .............. *F16C 33/08* (2013.01); *F16C 43/02* (2013.01); *F16C 2226/76* (2013.01); *F16C 2360/22* (2013.01)

(56) References Cited

U.S. PATENT DOCUMENTS

| | | | |
|---|---|---|---|
| 2012/0243815 A1* | 9/2012 | Kuwabara | F16C 43/02 384/420 |
| 2014/0177987 A1* | 6/2014 | Roberto | F16C 17/10 384/275 |

FOREIGN PATENT DOCUMENTS

| | | |
|---|---|---|
| JP | 51-124756 A | 10/1976 |
| JP | 2008-510107 A | 4/2008 |
| JP | 2015-110979 A | 6/2015 |
| JP | 2015-200381 A | 11/2015 |

* cited by examiner

SLIDING BEARING

TECHNICAL FIELD

The present invention relates to a technique for achieving both ease of assembly and dimensional accuracy of a flanged bearing.

BACKGROUND ART

Use of a half bearing and a flanged sliding bearing in a crankshaft in an automobile engine or the like is known. By this configuration, the half bearing receives a load in a direction perpendicular to an axial direction of an associated shaft, and the flange receives a load in the axial direction. For example, Patent Document 1 describes a thrust bearing assembly having a main bearing (corresponding to the half bearing) and a thrust washer (corresponding to the flange).

CITATION LIST

Patent Document

Patent Document 1: JP 2008-510107A

SUMMARY OF INVENTION

Technical Problem

In the technique described in Patent Document 1, the half bearing and the flange are not fixed to each other before assembly, which causes inconvenience during an assembly operation. However, if the half bearing and the flange are simply joined to each other, there is a concern that the dimensions of a free spread or the like of the half bearing will deviate from intended values thereof.

In view of this, the present invention provides a technique for achieving both ease of assembly and dimensional accuracy of a flanged bearing.

Solution to Problem

According to one aspect of the invention, there is provided a sliding bearing including: a half bearing member having an inner circumferential face that slides against an associated shaft, and a plurality of recesses provided in a first end face in an axial direction of the associated shaft; a flange member having a plurality of projections provided at positions corresponding to the plurality of recesses provided in the first end face; and a plurality of staking marks formed in a periphery of each recess when each recess is staked in a state where each of the plurality of projections is fitted to a corresponding one of the plurality of recesses in the first end face to fix the flange member to the half bearing member, wherein, a free spread of the half bearing member before the staking is at least 0.2 mm wider than a spread of the half bearing after the staking.

The free spread of the half bearing member before the staking may be at least 0.35 mm wider than a spread of the half bearing after the staking.

Effects of Invention

According to the present invention, both ease of assembly and dimensional accuracy of a flanged bearing can be achieved.

REFERENCE SIGNS LIST

Figure 1:
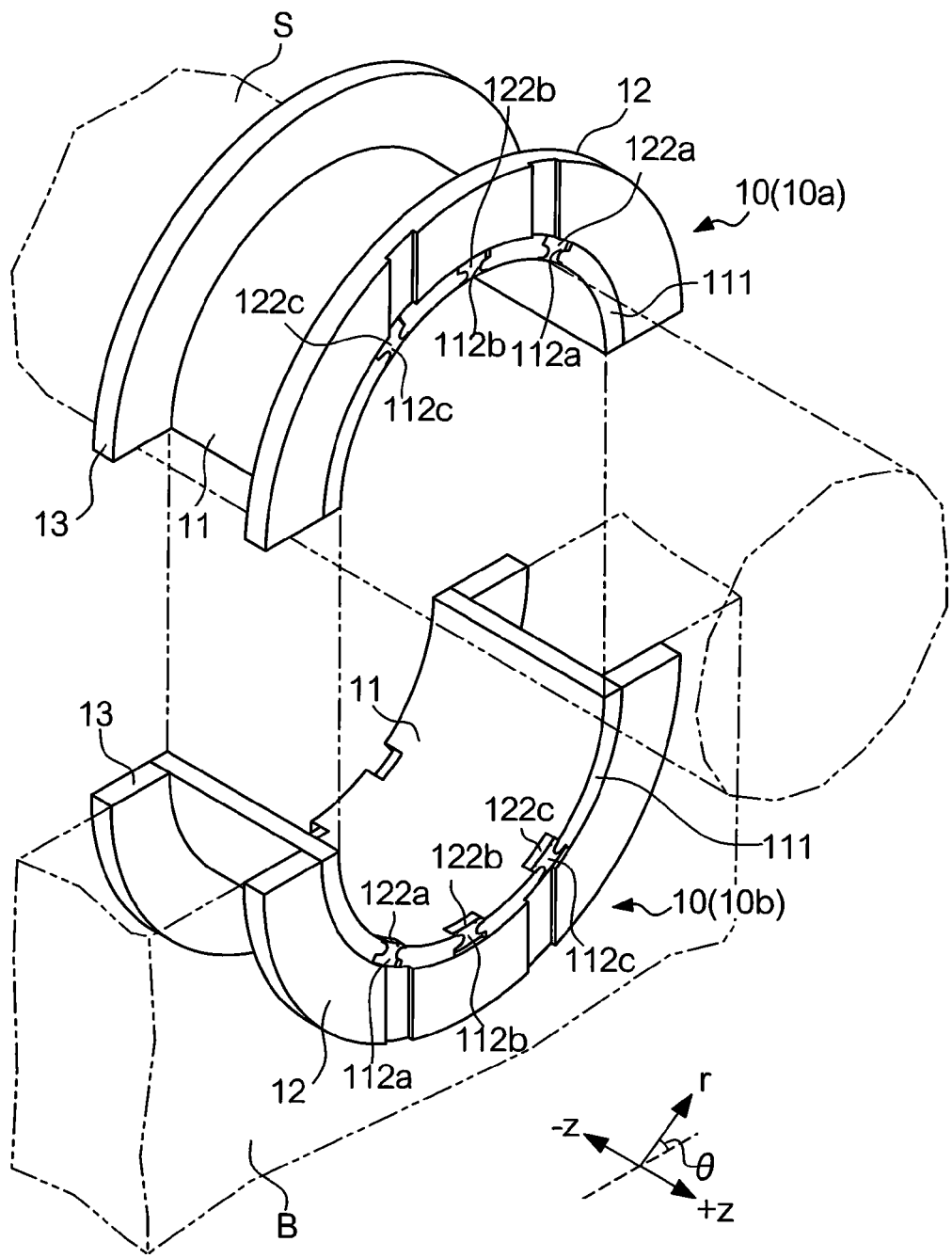
FIG. 1 is a diagram showing exemplary bearing 10 according to an embodiment.

10 Bearing
11 Half bearing member
12 Flange member
13 Flange member
111 Side face
112 Recess
113 Side face
114 Recess
115 Parting line
116 Parting line
117 Inner circumferential face
118 Overlay layer
119 Back face
121 Inner circumferential face
122 Projection
123 Parting line
124 Parting line
125 Thrust face
126 Lubrication groove

DESCRIPTION OF EXEMPLARY EMBODIMENTS

1. Configuration

FIG. 1 is a diagram showing exemplary bearing 10 according to an embodiment. Bearing 10 is a flange assembly (an example of a sliding bearing) for supporting crankshaft S in cylinder block B (an example of a housing) in an automobile engine, for example. Crankshaft S is a cylindrical shaft and rotates relative to bearing 10. Crankshaft S is an example of an associated shaft that is associated with bearing 10.

Bearing 10 has half bearing member 11, flange member 12 (an example of a first flange member), and flange member 13 (an example of a second flange member). Half bearing member 11 has a semi-cylindrical shape obtained by halving a cylinder in the axial direction. An inner circumferential face of half bearing member 11 slides against an outer circumferential face of crankshaft S. Half bearing member 11 is a main bearing that receives a load perpendicular to the axial direction. Flange member 12 and flange member 13 extend in a radial direction of the shaft from ends of half bearing member 11 in the axial direction. Flange member 12 and flange member 13 are thrust bearings (thrust washers) for receiving a load (thrust load) in the axial direction via cylinder block B (housing).

Bearing 10 supports half of the outer circumference of crankshaft S in a cross-section thereof perpendicular to the axial direction. That is to say, two bearings 10 are used at one portion to support the entire circumference of crankshaft S. In an example shown in FIG. 1, two bearings, namely bearing 10a and bearing 10b are used. Note that bearing 10a and bearing 10b do not necessarily need to be used as a pair, and only one of them may be used. In the case that these bearings are used as a pair, either bearing 10a or bearing 10b may not necessarily have a flange member, and the flange member may be provided in only one of the bearings, or at one end of both bearings. Furthermore, a later-described overlay layer may be provided in only one of bearing 10a and bearing 10b, or in both of them.

A coordinate system is defined for ease of understanding of the following description. In this coordinate system, the axial direction of the associated shaft is a z direction, and a position in the circumferential direction and the radial direction of the shaft is expressed as a polar coordinate system $(r,\theta)$. $\theta$ denotes a displacement angle from a reference plane (e.g. a horizontal plane), and r denotes a distance from a reference point (e.g. the center of the associated shaft).

Half bearing member 11 has a multi-layer structure in which a back metal, a lining layer, and an overlay layer (which are not shown in the diagram), are stacked in the radial direction of the associated shaft, for example. The back metal is a layer that gives half bearing member 11 mechanical strength. The back metal is made of steel, for example. The lining layer is a layer for improving bearing properties, e.g. frictional properties, seizure resistance, wear resistance, conformability, foreign particle embedding properties (robustness against foreign particle), corrosion resistance, and the like. The lining layer is made of a bearing alloy. To prevent adhesion to the shaft, a type of material different from the material of the shaft is used as the bearing alloy in order to avoid high friction that occurs between the shaft and a material having a similar composition. For example, if crankshaft S is made of steel, an alloy of materials other than steel, such as an aluminum alloy, is used as the bearing alloy. Note that, in addition to an aluminum alloy, an alloy using a metal other than aluminum as a base, such as a copper alloy, may be used. The overlay layer is formed with a resin coating or metal plating as a coating layer for improving the properties of the lining layer, such as a friction coefficient, conformability, corrosion resistance, foreign particle embedding properties (robustness against foreign particle), and the like. It should be noted that the overlay layer may be omitted.

Flange member 12 and flange member 13 are made of a material similar to that of half bearing member 11. However, flange member 12 and flange member 13 are manufactured separately from half bearing member 11, and are thereafter fixed to half bearing member 11. Therefore, flange member 12 and flange member 13 may be made of a material different from that of half bearing member 11, or may be formed to have a different thickness.

For fixation between half bearing member 11 and flange member 12, recesses 112 are formed in end face 111 of half bearing member 11 on one end side in the axial direction, and projections 122 are formed in inner circumferential face 121 of flange member 12 on the inside thereof in the radial direction. Here, end face 111 (an example of a first end face) is a face whose normal line is oriented in the +z-axial direction. Half bearing member 11 also has an end face (an example of a second end face) on the side opposite to end face 111 (a portion that is hidden in FIG. 1), and recesses are also formed in this end face. In this example, three recesses 112 and three projections 122 (recesses 112a to 112c and projections 122a to 122c) are formed. Recess 112a and projection 122a, recess 112b and projection 122b, and recess 112c and projection 122c are respectively fitted to each other. Note that the width of each recess 112 is formed to be wider than the width of each projection 122.

Flange member 12 is fixed to half bearing member 11 by staking regions close to each recess 112, in a state where each recess 112 is fitted to corresponding projection 122. Here, "staking" refers to joining target parts by applying pressure thereto using a specific component. Thus, half bearing member 11 and flange member 12 are fixed to and integrated with each other when assembled to cylinder block B. By use of bearing 10 according to this embodiment, the man-hours for assembly to cylinder block B can be reduced, and the possibility of erroneous assembly with regard to the orientation of flange member 12 can also be reduced, compared with the case of assembling, to cylinder block B, half bearing member 11 and flange member 12 in a state that they are not fixed to each other. Note that, although description thereof is omitted herein, the fixation between flange member 13 and half bearing member 11 is similar to the fixation between flange member 12 and half bearing member 11.

Note that the fixation between half bearing member 11 and flange member 12 needs to be maintained at least only while bearing 10 is assembled to cylinder block B. After assembly, the fixation state may not necessarily be maintained when the engine is driven. The staking of flange member 12 may be released as a result of receiving a load in the axial direction. In this case, when the engine operates, flange member 12 moves in accordance with the load, comes into contact with cylinder block B, and receives a load.

2. Manufacturing Method

Figure 2:
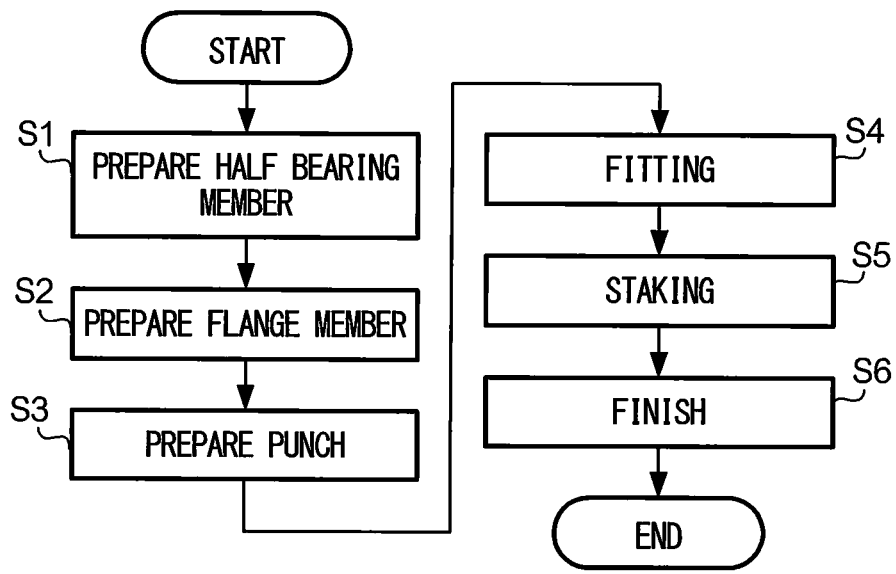
FIG. 2 is a flowchart of an exemplary method for manufacturing bearing 10 according to an embodiment.

FIG. 2 is a flowchart of an exemplary method for manufacturing bearing 10 according to an embodiment.

In process S1, half bearing member 11 is prepared.

Figure 3:
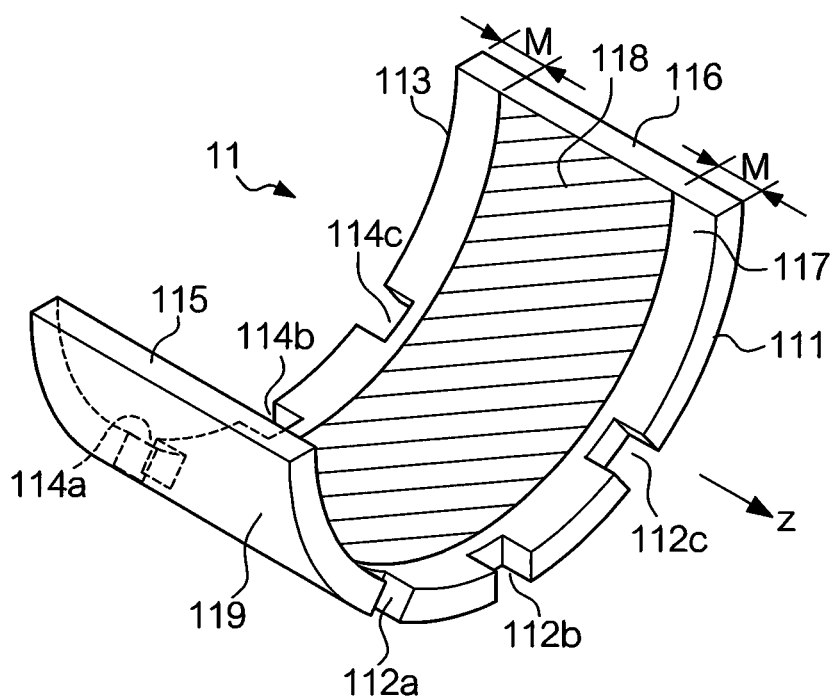
FIG. 3 is a diagram showing an exemplary external appearance of half bearing member 11.

FIG. 3 is a diagram showing an exemplary external appearance of half bearing member 11. A method for manufacturing half bearing member 11 is as follows, for example. Initially, the bearing alloy that is to serve as the lining layer is, for example, pressure-welded onto a plate-shaped back metal to obtain a bimetal. This plate-shaped base material is cut into short strips (small pieces) collectively having a size corresponding to half bearing member 11, and these strips are formed into a semi-cylindrical shape. Thereafter, portions corresponding to both end sides in the axial direction are cut off at a certain width. Thereafter, the recesses that pass through from the top to the bottom of half bearing member 11 are formed, and the overlay layer is formed over the bimetal according to the required properties. The height of these recess forming portions is lower than that of a sliding face of half bearing member 11.

Half bearing member 11 has overlay layer 118 on a part of inner circumferential face 117. Overlay layer 118 extends in the circumferential direction of the associated shaft. Front faces at both ends of overlay layer 118 in the axial direction are machined, and the lining layer or the back metal is exposed. Recesses 112 and recesses 114 are formed in the part where the lining layer or the back metal is exposed. In this example, recesses 112 are formed in face 111 that is one end face of half bearing member 11 in the axial direction, and pass through from inner circumferential face 117 to outer circumferential face 119. The same applies to recesses 114. Note that recesses 112 and recesses 114 may not pass through up to inner circumferential face 117.

Figure 4:
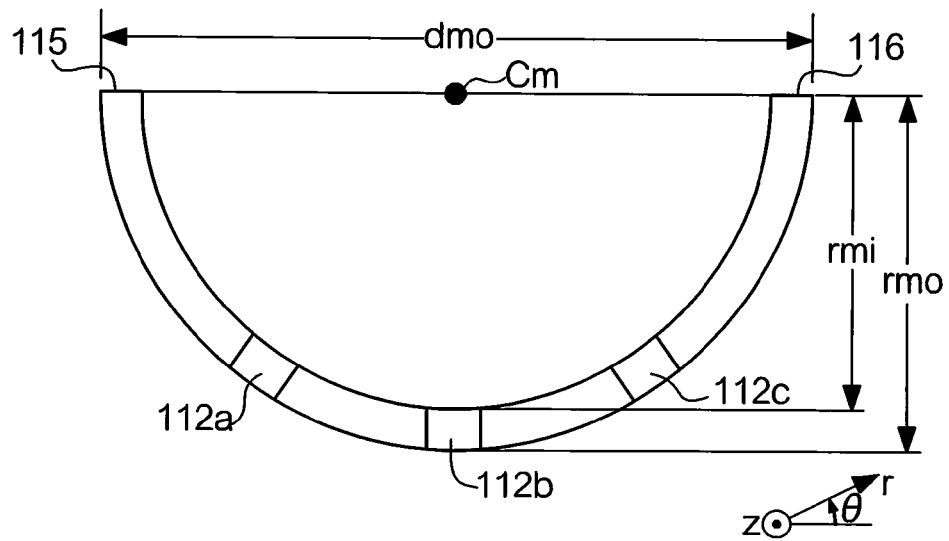
FIG. 4 is an external view of half bearing member 11 when viewed in an axial direction.

FIG. 4 is an external view of half bearing member 11 when viewed in the axial direction. Recess 112b is formed in a central part of the inner circumference of half bearing member 11. Recess 112a is formed on the −θside when viewed from recess 112b, and recess 112c is formed on the +θside when viewed from recess 112b. The distance from recess 112b to recess 112a is equal to the distance from recess 112b to recess 112c.

Half bearing member 11 has parting line 115 and parting line 116 that come into contact with another bearing 10. Considering midpoint Cm of a line connecting parting line 115 to parting line 116 to be an imaginary central point, distance rmi from midpoint Cm to the sliding face is referred to as an "inner radius," and distance rmo to the outer circumferential face (back face) is referred to as an "outer radius." In half bearing member 11, the outer radius is not strictly uniform. Outer diameter dmo on the parting lines is larger than imaginary outer diameter 2 rmo of the central part. That is to say, the outer circumferential face of half bearing member 11 is not a mathematically accurate arc. The same applies to the inner radius. At this time, outer diameter dmo is referred to as a "free spread." With some free spread, tensile force from the inside to the outside of half bearing member 11 is exerted on cylinder block B, and the effect of suppressing bearing 10 being detached from cylinder block B is obtained. The amount of free spread is designed in accordance with the dimensions of the bearing. In this example, it is preferred that the free spread of half bearing member 11 before it is fixed to flange member 12 (otherwise referred to as the free spread before fixation) is at least 0.2 mm wider than that after the fixation (the free spread of a finished product). It is more preferred that the free spread before fixation is at least 0.35 mm wider than the free spread after fixation. For example, if the free spread of a finished product is 60.0 mm, the free spread before fixation is designed to be 60.35 mm. The reason for the design will be described later. In this regard, it should be noted that if a flange member 12 is detached from half bearing member 11, the free spread increases before the detachment.

Refer to FIG. 2 again. In process S2, flange member 12 and flange member 13 are prepared. In this example, only flange member 12 will be described, since flange member 12 and flange member 13 have an identical shape.

Figure 5:
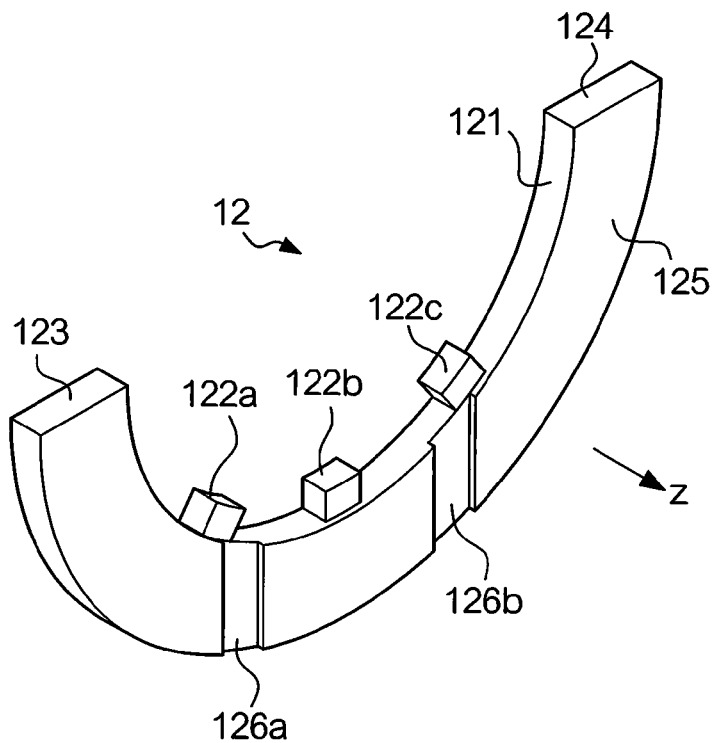
FIG. 5 is a diagram showing an exemplary external appearance of flange member 12.

FIG. 5 is a diagram showing an exemplary external appearance of flange member 12. A method for manufacturing flange member 12 is as follows, for example. Initially, a plate-shaped bimetal is formed, similar to half bearing member 11. A shape corresponding to flange member 12 is cut out from this plate-shaped base material. Furthermore, an overlay layer is formed according to the required properties, if necessary.

Flange member 12 has thrust face 125 for receiving a thrust load, and inner circumferential face 121 that comes into contact with half bearing member 11. Lubrication grooves 126 are formed in thrust face 125. In this example, two lubrication grooves, namely lubrication groove 126a and lubrication groove 126b are formed. Lubrication grooves 126 are grooves for holding lubricating oil and also serving as an oil supply route for receiving a supply of the lubricating oil from half bearing member 11. Projections 122 are formed in inner circumferential face 121.

Figure 6:
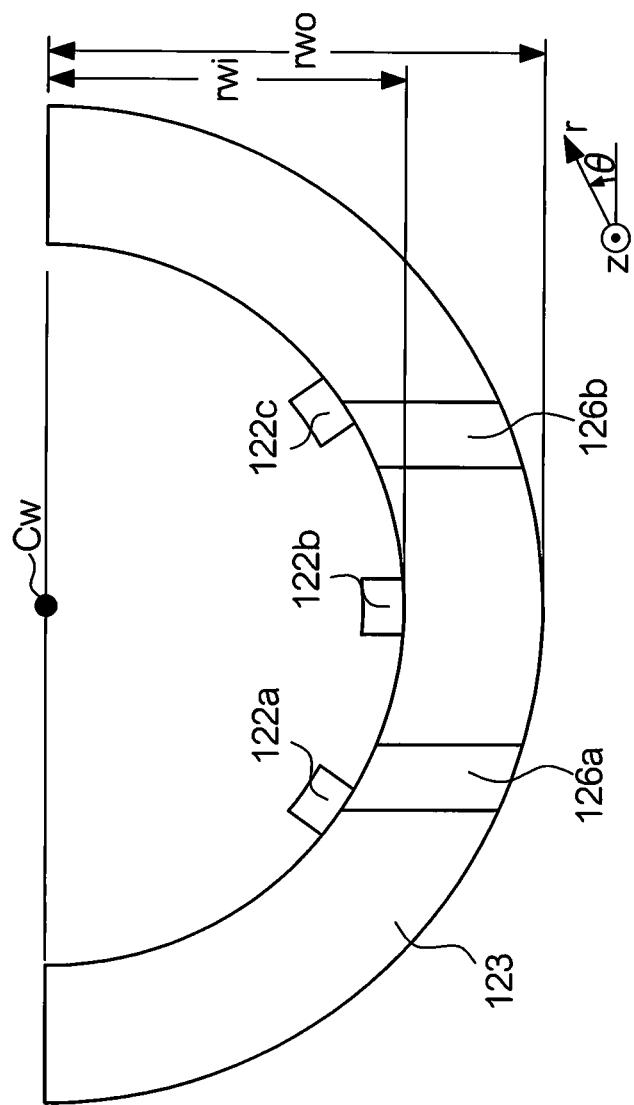
FIG. 6 is an external view of flange member 12 when viewed in the axial direction.

FIG. 6 is an external view of flange member 12 when viewed in the axial direction. Projection 122b is formed in a central part of the inner circumference of flange member 12. Projection 122a is formed on the −θside when viewed from projection 122b, and projection 122c is formed on the +θside when viewed from projection 122b. The distance from projection 122b to projection 122a is equal to the distance from projection 122b to projection 122c. Projections 122a to 122c are formed at positions such that they can be fitted to recesses 112a to 112c in half bearing member 11.

Flange member 12 has parting line 123 and parting line 124 that correspond respectively to parting line 115 and parting line 116 of half bearing member 11. Considering midpoint Cw of a line connecting parting line 123 and parting line 124 to be an imaginary central point, distance rwi from midpoint Cw to the inner circumferential face is referred to as an "inner radius," and distance rwo to the outer circumferential face is referred to as an "outer radius." The inner radius of flange member 12 is substantially equal to the outer radius of half bearing member 11.

Refer to FIG. 2 again. In process S3, a punch (tool) to be used for staking is prepared. In process S4, recesses 112 in half bearing member 11 and projections 122 in flange member 12 are fitted to each other. In process S5, regions close to each recess 112 in half bearing member 11 are staked. In the example of half bearing member 11 in FIG. 4 and flange member 12 in FIG. 5, six portions (both ends of each of three recesses 112) are staked to one flange member 12. These six portions may be staked with approximately the same force. For example, punches used for staking these six portions may have the same shape, in which case these staking marks have substantially the same shape. That is, for all the staking marks, the shape of the staking marks in the cross section perpendicular to the axial direction is substantially the same (the angle formed by the two wall faces is the same). Alternatively, these six portions may not be staked using approximately the same force. For example, the staking of a portion close to parting line 116 (the outermost two of the six staking portions) may be staked using a weaker force than that used for the other portions. For example, a punch used for staking the two outermost portions may have a smaller tip angle than the other punches. That is, for staking two outermost portions, the shape of the staking mark in the cross section perpendicular to the axial direction is smaller in angle (the angle formed by the two wall surfaces) than the other staking marks. In addition, at side surface 113, flange member 12 is fitted and staked in a manner similar to that used to fit flange member 12 at side surface 111.

In process S6, bearing 10 is finished. According to this embodiment, a bearing that achieves both ease of assembly to a housing and dimensional accuracy can be obtained.

3. Modifications

The present invention is not limited to the above-described embodiment, and various modifications are possible. Some modifications will be described below. Two or more of the following modifications may be combined.

The shape and the number of the recesses in half bearing member 11, and the shape and the number of the projections in flange member 12 are not limited to those described in the embodiment. Furthermore, the recesses and the projections may not be arranged at equal intervals. The same applies to flange member 13.

The specific shape of bearing 10 is not limited to that described in the embodiment. For example, in the inner circumferential face of half bearing member 11, both side portions on the front face may not be machined, and overlay layer 118 may be formed over the whole face. Half bearing member 11 may have a pawl for positioning, in a region close to either one of the parting lines. Furthermore, flange member 12 and flange member 13 may have a projecting detent for preventing relative rotation with respect to cylinder block B, in their outer circumferential faces. The shape and the number of lubrication grooves 126 are not limited to those described in the embodiment either.

In bearing 10, the flange members (flange member 12 and flange member 13) are fixed to respective ends in the axial direction. However, a flange member may be fixed to only one end.

In this embodiment, two identical bearings 10 are used for supporting one portion of the associated shaft. However, the two bearings used here may have inner circumferential faces (sliding faces) of different shapes, for example. For example, a lubrication groove or a lubrication hole may be provided in one of the upper and lower sliding faces. The usage of bearing 10 is not limited to supporting of crankshaft S.

The invention claimed is:

1. A sliding bearing comprising:
    a half bearing member having an inner circumferential face that slides against an associated shaft, and a plurality of recesses provided in a first end face in an axial direction of the associated shaft;
    a flange member having a plurality of projections provided at positions corresponding to the plurality of recesses provided in the first end face; and
    a plurality of staking marks formed in a periphery of each recess when each recess is staked in a state where each of the plurality of projections is fitted to a corresponding one of the plurality of recesses in the first end face to fix the flange member to the half bearing member, wherein
    a free spread of the half bearing member before the staking is at least 0.2 mm wider than a spread of the half bearing after the staking.

2. The sliding bearing according to claim 1, wherein
    the free spread of the half bearing member before the staking is at least 0.35 mm wider than a spread of the half bearing after the staking.

* * * * *